(12) United States Patent
Pajukoski et al.

(10) Patent No.: US 8,274,931 B2
(45) Date of Patent: Sep. 25, 2012

(54) SIGNALLING WITHIN A COMMUNICATION SYSTEM

(75) Inventors: Kari Pekka Pajukoski, Oulu (FI); Esa Tapani Tiirola, Kempele (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 12/451,204

(22) PCT Filed: Apr. 15, 2008

(86) PCT No.: PCT/EP2008/054567
§ 371 (c)(1),
(2), (4) Date: Mar. 23, 2010

(87) PCT Pub. No.: WO2008/132047
PCT Pub. Date: Nov. 6, 2008

(65) Prior Publication Data
US 2010/0195532 A1    Aug. 5, 2010

(30) Foreign Application Priority Data
Apr. 30, 2007   (GB) .................................. 0708345.4

(51) Int. Cl.
*H04L 12/28* (2006.01)
*H04L 27/00* (2006.01)
*H04W 72/00* (2009.01)

(52) U.S. Cl. ........ 370/328; 370/254; 370/280; 370/329; 370/330; 370/203; 455/447; 455/450; 455/522; 455/452.2; 455/455; 375/257; 375/259; 375/260; 375/267

(58) Field of Classification Search .......... 370/254–463; 375/259–267; 455/450–455
See application file for complete search history.

(56) References Cited

U.S. PATENT DOCUMENTS

| | | | | |
|---|---|---|---|---|
| 5,570,349 | A * | 10/1996 | Bustamante et al. | 370/335 |
| 5,734,639 | A * | 3/1998 | Bustamante et al. | 370/208 |
| 6,377,640 | B2 * | 4/2002 | Trans | 375/354 |
| 6,914,539 | B2 * | 7/2005 | Hoctor et al. | 340/870.12 |
| 7,397,859 | B2 * | 7/2008 | McFarland | 375/260 |
| 7,643,832 | B2 * | 1/2010 | Cudak et al. | 455/450 |
| 7,693,224 | B2 * | 4/2010 | Rhodes | 375/260 |
| 7,747,225 | B2 * | 6/2010 | Wang et al. | 455/69 |
| 7,773,535 | B2 * | 8/2010 | Vook et al. | 370/252 |
| 7,787,417 | B2 * | 8/2010 | Yamasaki et al. | 370/329 |
| 7,809,074 | B2 * | 10/2010 | Kotecha et al. | 375/267 |
| 7,881,721 | B2 * | 2/2011 | McCoy et al. | 455/447 |

(Continued)

FOREIGN PATENT DOCUMENTS

WO    2006/020483    2/2006

(Continued)

OTHER PUBLICATIONS

R1-072988, 3GPP TSG RAN WG1 #49bis, Nokia Siemens Networks, Nokia "UL Sounding Reference Signal", Jun. 25-29, 2007.

(Continued)

*Primary Examiner* — Phirin Sam
*Assistant Examiner* — Venkatesh Haliyur
(74) *Attorney, Agent, or Firm* — Staas & Halsey LLP

(57) ABSTRACT

Sounding reference signal presence information is incorporated into an uplink data resource assignment for a user equipment, and the uplink data assignment including the sounding reference signal presence information is sent to the user equipment.

20 Claims, 3 Drawing Sheets

U.S. PATENT DOCUMENTS

| | | | |
|---|---|---|---|
| 7,899,481 B2* | 3/2011 | McCoy et al. | 455/522 |
| 7,904,110 B2* | 3/2011 | Young et al. | 455/552.1 |
| 7,986,959 B2* | 7/2011 | Malladi et al. | 455/522 |
| 8,036,672 B2* | 10/2011 | Laroia et al. | 455/450 |
| 2002/0006167 A1* | 1/2002 | McFarland | 375/260 |
| 2004/0066312 A1* | 4/2004 | Hoctor et al. | 340/870.07 |
| 2006/0083319 A1* | 4/2006 | Giannakis et al. | 375/259 |
| 2006/0176972 A1* | 8/2006 | Kim et al. | 375/267 |
| 2006/0222091 A1* | 10/2006 | Rhodes | 375/260 |
| 2007/0153731 A1* | 7/2007 | Fine | 370/329 |
| 2008/0182582 A1* | 7/2008 | Bachl et al. | 455/446 |
| 2008/0200203 A1* | 8/2008 | Malladi et al. | 455/522 |
| 2008/0207150 A1* | 8/2008 | Malladi et al. | 455/127.1 |
| 2008/0227495 A1* | 9/2008 | Kotecha et al. | 455/562.1 |
| 2008/0232234 A1* | 9/2008 | McCoy et al. | 370/203 |
| 2008/0232300 A1* | 9/2008 | McCoy et al. | 370/328 |
| 2008/0232449 A1* | 9/2008 | Khan et al. | 375/220 |
| 2008/0233967 A1* | 9/2008 | Montojo et al. | 455/452.2 |
| 2008/0268857 A1* | 10/2008 | McCoy et al. | 455/447 |
| 2008/0280638 A1* | 11/2008 | Malladi et al. | 455/522 |
| 2008/0298477 A1* | 12/2008 | Classon | 375/260 |
| 2009/0180414 A1* | 7/2009 | Maeda et al. | 370/311 |
| 2009/0181687 A1* | 7/2009 | Tiirola et al. | 455/450 |
| 2009/0238241 A1* | 9/2009 | Hooli et al. | 375/133 |
| 2009/0274074 A1* | 11/2009 | Astely | 370/280 |
| 2009/0278742 A1* | 11/2009 | Mehta et al. | 342/374 |
| 2009/0316811 A1* | 12/2009 | Maeda et al. | 375/260 |
| 2010/0067472 A1* | 3/2010 | Ball et al. | 370/329 |
| 2010/0142467 A1* | 6/2010 | Tiirola et al. | 370/329 |
| 2010/0195532 A1* | 8/2010 | Pajukoski et al. | 370/254 |
| 2010/0238888 A1* | 9/2010 | Sampath et al. | 370/329 |
| 2010/0238901 A1* | 9/2010 | Sampath et al. | 370/331 |
| 2010/0240382 A1* | 9/2010 | Sampath et al. | 455/450 |
| 2011/0085516 A1* | 4/2011 | Pajukoski et al. | 370/330 |
| 2011/0103317 A1* | 5/2011 | Ribeiro et al. | 370/329 |
| 2011/0194485 A1* | 8/2011 | Horneman et al. | 370/315 |
| 2011/0294530 A1* | 12/2011 | Malladi et al. | 455/509 |
| 2012/0002568 A1* | 1/2012 | Tiirola et al. | 370/252 |

FOREIGN PATENT DOCUMENTS

WO    WO 2009136657 A1 * 11/2009

OTHER PUBLICATIONS

R1-063056, 3GPP TSG RAN1#47, Motorola: "Uplink Reference Signal Multiplexing for E-UTRA", Nov. 6-10, 2006, p. 4 lines 8-9.
R1-070633, "Approved Report of 3GPP TSG RAN WG1 #47", Nov. 6-10, 2006.
R1-071340, 3GPP TSG RAN WG1 Meeting #48bis, Motorola "Considerations and Recommendations for UL Sounding RS", Mar. 26-30, 2007.

* cited by examiner

SIGNALLING WITHIN A COMMUNICATION SYSTEM

CROSS REFERENCE TO RELATED APPLICATIONS

This application is based on and hereby claims priority to PCT Application No. PCT/EP2008/054567 filed on Apr. 15, 2008 and GB Application No. 0708345.4 filed on Apr. 30, 2007, the contents of which are hereby incorporated by reference.

BACKGROUND

Embodiments of the present invention relate to methods of signaling within a communication system. In particular, embodiments relate to sounding reference signaling within a communication system and methods of managing the same. Embodiments of the present invention also relate to a communication network, a network entity, and a user equipment adapted to perform the methods.

A communication device can be understood as a device provided with appropriate communication and control capabilities for enabling use thereof for communication with other parties. The communication may comprise, for example, communication of voice, electronic mail (email), text messages, data, multimedia and so on. A communication device typically enables a user of the device to receive and transmit communication via a communication system and can thus be used for accessing various applications. Such a communication device is also known as user equipment.

A communication system is a facility which facilitates the communication between two or more entities such as the communication devices, network entities and other nodes. A communication system may be provided by one or more interconnected networks. One or more gateway nodes may be provided for interconnecting various networks of the system. For example, a gateway node is typically provided between an access network and other communication networks, for example a core network and/or a data network.

An appropriate access system allows the communication device to access to the wider communication system. Access to the wider communications system may be provided by a fixed line or wireless communication interface, or a combination of these. Communication systems providing wireless access typically enable at least some mobility for the users thereof. Examples of these include wireless communication systems where the access is provided by an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment (UE), is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more cells or sectors. It is noted that in certain systems a base station is called 'Node B'. When a mobile device moves from a base station to another base station, handover (HO) techniques are used to ensure that the communication is not lost as a consequence of the move. There are many different techniques for processing signals for transmission between the base station and the user equipment, and the precise handover technique which is used depends on the access system.

In one common signaling technique, data to be transmitted is divided into blocks. These blocks are encoded and interleaved for transmission. The length of each block is known as the transmission time interval (TTI). A number of blocks can be sent in each transmission time interval, each block have a different frequency. The data transmitted within a block can be encoded with different symbols. As such, both code division multiplexing (CDM) and frequency division multiplexing (FDM) can be used to encode and decode the signals within a transmission time interval.

Typically the operation of a base station apparatus and other apparatus of an access system required for the communication is controlled by a particular control entity. The control entity is typically interconnected with other control entities of the particular communication network. Handover management is typically provided by an appropriate handover control entity of the cellular communication system. The handover controller typically provides a centralized control of handovers in a radio access network so as to appropriately control the handover in different cells of the access network. For example, a radio network controller (RNC) centrally manages handovers in Universal Terrestrial Radio Access Networks (UTRAN) and a base station controller (BSC) manages the handovers in GSM (Global System for Mobile) EDGE (Enhanced Data for GSM Evolution) Radio Access Networks (GERAN).

Further to the above, it has been proposed that various control functions that have been typically handled by a centralized controller can also be handled in a distributed manner. This kind of distributed architecture is sometimes referred to as a "flat architecture". In view of handover management this means that there is no central node in a radio access network, but the handover control is distributed to be taken care of by a base station and associated local control functions thereof.

A non-limiting example of such architectures is a concept known as the Evolved Universal Terrestrial Radio Access (E-UTRA) also known as long term evolution (LTE). An Evolved Universal Terrestrial Radio Access Network (E-UTRAN) including E-UTRAN Node Bs (eNBs) which are configured to provide base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices. The eNBs interface to an E-UTRAN access gateway (aGW) via a so called S1 interface, and are inter-connected via a so called X2 interface.

There is always a need to improve the performance of communications systems and it is an aim of the present invention to provide a new way of achieving this.

SUMMARY

In the current E-UTRAN specification work there has been, and still is, an ongoing discussion concerning the signaling procedures to be used in the downlink (from the network to the user equipment) and uplink (from the user equipment to the network) directions between the eNBs and the user equipment. One particular area of interest is the procedure for sending sounding reference signals (SRSs) in the uplink (UL) direction. That is, the procedure for controlling user equipment in order to transmit sounding reference signals in uplink.

Channel sounding is needed by various purposes including: channel quality measurement for frequency/time aware scheduling; channel quality measurement for link adaptation; channel quality measurement for Power control; timing measurement; and channel quality measurement for Single User—Multiple Input Multiple Output, SU-MIMO (closed loop antenna selection). It is noted that channel sounding can be used also for DL (DownLink) channel quality measurement in TDD (Time Division Duplex) systems.

Besides the possible sounding reference signals, there are also two demodulation reference signals (DM RS) in to be sent in each Transmission Time Interval (TTI) supporting coherent detection.

Some working assumptions regarding the aforementioned reference signals have been agreed at the 3GGP TSG RAN WG1 Meeting #47 held in Riga, and are set out in the published report of this meeting [R1-070633, "Approved Report of 3GPP TSG RAN WG1 #47", 3GPP]. First of all, it has been agreed that sounding reference signals and demodulation reference signals are provided in different blocks. Furthermore, it has been agreed that code division multiplexing (CDM) is the multiplexing scheme for sounding reference signals of the same bandwidth (BW), whereas a combination of CDM and frequency division multiplexing (FDM) is used when there are multiple sounding bandwidths. It is further assumed that sounding reference signals will be configured by RRC (Radio Resource Control) or signaling.

One problem to which certain embodiments of the present invention relates is to the system overhead caused by sounding reference signals.

The present inventors have noted that overhead caused by sounding reference signals will impact not only on the "sounding" user equipment but also on "non-sounding" user equipments being scheduled for the sounding bandwidth. This will be the case where all the scheduled user equipments lose the sounding symbol even though the sounding reference signal covers only part of the spectrum.

A related art solution to minimize the overhead problem caused by sounding reference signaling was reported at the 3GGP TSG RAN WG1 Meeting #48bis held in Malta, and is set out in a published report from this meeting [R1-071340, "Considerations and Recommendations for UL Sounding RS", Motorola].

The aforementioned related art report suggests that the presence of sounding blocks (in the time dimension) and their occupied frequency range is specified with control signaling that is received by all user equipments. The user equipments will then know what channel resources are "punctured out" of any uplink data assignments.

Thus, in the aforementioned related art arrangement, the presence information for sounding reference signals and the uplink data assignments are sent as separate signals. The presence information is non-user-equipment specific and is sent to all user equipments. The user equipments will be required to save the sounding reference signal presence information such that when a user equipment receives an uplink data assignment, it can access the saved sounding reference signal presence information, check whether a sounding reference signal is present in resource allocated to it for uplink data transmission, and only send uplink data on resource which is not occupied by a sounding reference signal.

The present inventors have realized that rather than sending the sounding reference signal presence information to all user equipments, as discussed above for implementation as a standard in E-UTRAN architectures, it would be advantageous to implement a procedure in which signaling to the user equipments regarding the presence of sounding reference signals is user equipment specific. That is, the present inventors have realized that not all the user equipments will require the information, and those that do will be required to react to this information in different ways. Accordingly, it would be advantageous if the signaling procedure could reflect these requirements, as this would reduce signaling burden on the network and user equipments while allowing the user equipments to more easily recognize whether or not sounding reference signals are present and how to deal with this, thus reducing processing and data storage in the user equipments.

The aforementioned aims may be achieved by incorporating sounding reference signal presence information into an uplink data assignment for a user equipment and sending the uplink data assignment including the sounding reference presence information to the user equipment.

By sending the sounding reference signal presence information in an uplink data assignment for a user equipment, separate signaling of the sounding reference signal presence information to all user equipments, and storage of the information in all the user equipments, is not required. The signaling is user-equipment specific and allows the network to indicate to a particular user equipment whether or not sounding reference signals are present in resource allocated to that user equipment for use in transmitting data signals in uplink. The presence or absence of sounding reference signals in a user equipment's uplink resource allocation may be signaled to the user equipment in so called uplink allocation grant signaling sent to the user equipment, and could, in its simplest form, be a single bit.

Embodiments of the present invention thus avoid the situation where all the scheduled user equipments lose the "sounding" symbol even though the sounding reference signal covers only part of the spectrum. Furthermore, embodiments of the present invention avoid the need to send sound reference signal information to all the user equipments by providing that the presence of sounding reference signals is indicated in the uplink allocation grant signaling, which is user equipment specific. The signaling may be implemented using a single bit in the uplink resource allocation grant signaling. The present inventors call this bit the "SRS presence" bit.

The present inventors have further realized that the inventive concept underlying the idea discussed above is not limited to the aforementioned access methods and network architecture and may be applied more generally using different access methods and architectures.

In light of the above, in accordance with an embodiment there is provided a method comprising: incorporating sounding reference signal presence information into an uplink data resource assignment for a user equipment; and sending the uplink data assignment including the sounding reference signal presence information to the user equipment. This method may be performed by an apparatus such as a network entity of a communication network, preferably an access node of the communication network.

In accordance with another embodiment there is provided a method comprising: receiving an uplink data resource assignment comprising sounding reference signal presence information at a user equipment; and sending uplink data from the user equipment based on the sounding reference presence information. This method may be performed by an apparatus such as a user equipment, preferably a mobile communication device.

In accordance with a certain embodiment, sounding, configured by RRC signaling for example, can implicitly be switched on or off by the sounding reference signal presence information in the uplink data resource assignment (e.g. an SRS presence bit in the uplink data resource assignment). This feature is advantageous in that it is not necessary to have additional signaling for dynamically switching sounding on or off.

According to another embodiment there is provided a communication network arranged to perform the methods described herein.

According to another embodiment there is provided computer program comprising program code adapted to perform the method described herein when the program is run on a computer or on a processor.

According to another embodiment there is provided a computer program comprising program code stored in a computer readable medium, the program code being adapted to perform the method described herein when the program is run on a computer or on a processor.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
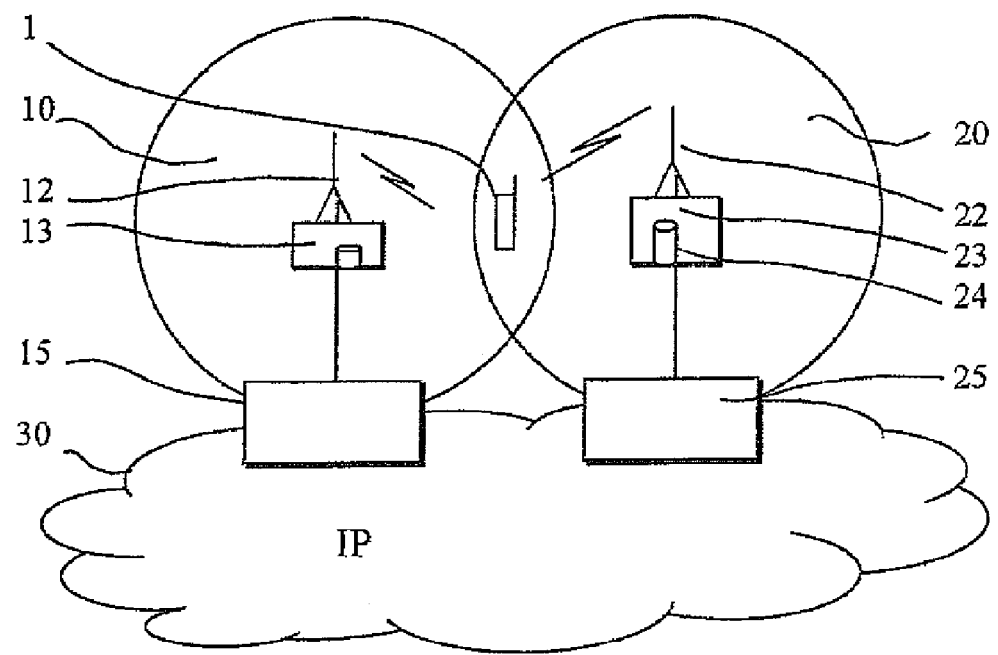
FIG. 1 shows a schematic presentation of two wireless access systems a mobile device may use for accessing a data network.

Reference will now be made in detail to the preferred embodiments of the present invention, examples of which are illustrated in the accompanying drawings, wherein like reference numerals refer to like elements throughout.

It will be understood that in the following description the present invention is described with reference to particular non-limiting examples from which the invention can be best understood. The invention, however, is not limited to such examples.

Before explaining in detail certain exemplifying embodiments, certain general principles of wirelessly accessing a communication system are briefly explained with reference to FIGS. 1 and 2.

A communication device can be used for accessing various services and/or applications provided via a communication system. In wireless or mobile systems the access is provided via an access interface between a mobile device 1 and an appropriate wireless access system 10 and 20.

A mobile device 1 can typically access wirelessly a communication system via at least one base station 12 and 22 or similar wireless transmitter and/or receiver node. Non-limiting examples of appropriate access nodes are a base station of a cellular system and a base station of a wireless local area network (WLAN). Each mobile device may have one or more radio channels open at the same time and may be connected to more than one base station.

A base station is typically controlled by at least one appropriate controller entity 13, 23 so as to enable operation thereof and management of mobile devices in communication with the base station. The controller entity is typically provided with memory capacity and at least one data processor.

A mobile device may be used for accessing various applications. For example, a mobile device may access applications provided in a data network 30. For example, various applications may be offered in a data network that is based on the Internet Protocol (IP) or any other appropriate protocol.

In FIG. 1 the base station nodes 12 and 22 are connected to the data network 30 via appropriate gateways 15 and 25 respectively. A gateway function between a base station node and another network may be provided by any appropriate gateway node, for example a packet data gateway and/or an access gateway.

Figure 2:
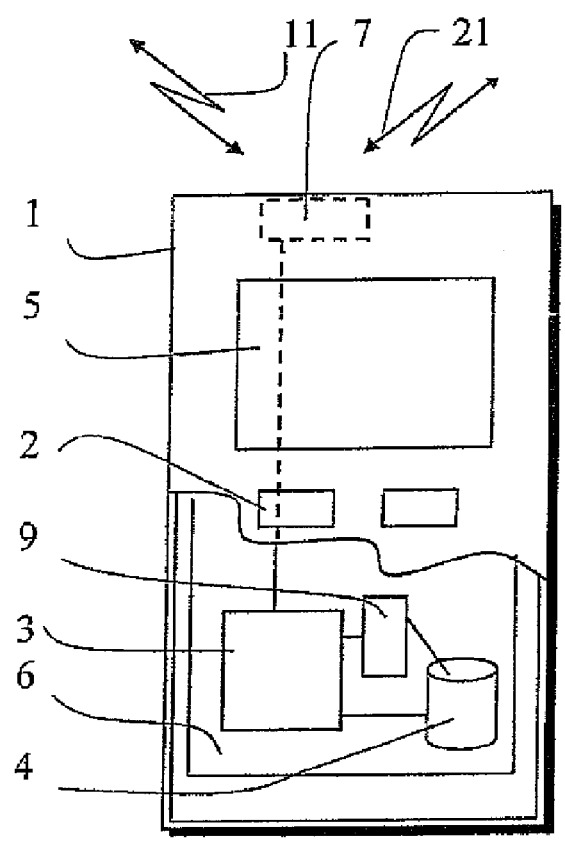
FIG. 2 shows a partially sectioned view of a mobile device.

FIG. 2 shows a schematic partially sectioned view of a mobile device 1 that can be used for accessing a communication system via a wireless interface. The mobile device 1 of FIG. 1 can be used for various tasks such as making and receiving phone calls, for receiving and sending data from and to a data network and for experiencing, for example, multimedia or other content.

An appropriate device may be provided by any device capable of at least sending or receiving radio signals. Non-limiting examples include a mobile station (MS), a portable computer provided with a wireless interface card or other wireless interface facility, personal data assistant (PDA) provided with wireless communication capabilities, or any combinations of these or the like. The mobile device 1 may communicate via an appropriate radio interface arrangement of the mobile device. In FIG. 1 the radio interface arrangement is designated schematically by block 7. The interface arrangement may be provided for example by a radio part and associated antenna arrangement. The antenna arrangement may be arranged internally or externally to the mobile device.

A mobile device is typically provided with at least one data processing entity 3 and at least one memory 4 for use in tasks it is designed to perform. The data processing and storage entities can be provided on an appropriate circuit board and/or in chipsets. This feature is denoted by reference 6.

The user may control the operation of the mobile device by a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

The mobile device 1 may be enabled to communicate with a number of access nodes, for example when it is located in the coverage areas of the two base stations 12 and 22 of FIG. 1. This capability is illustrated in FIG. 2 by the two wireless interfaces 11 and 21.

Embodiments of the present invention will now be described below.

The usage of physical uplink resources is signaled from an eNB to a user equipment typically on a TTI per TTI time scale. The signaling is realized by a downlink control channel by way of a so called allocation table or allocation grant.

Figure 3:
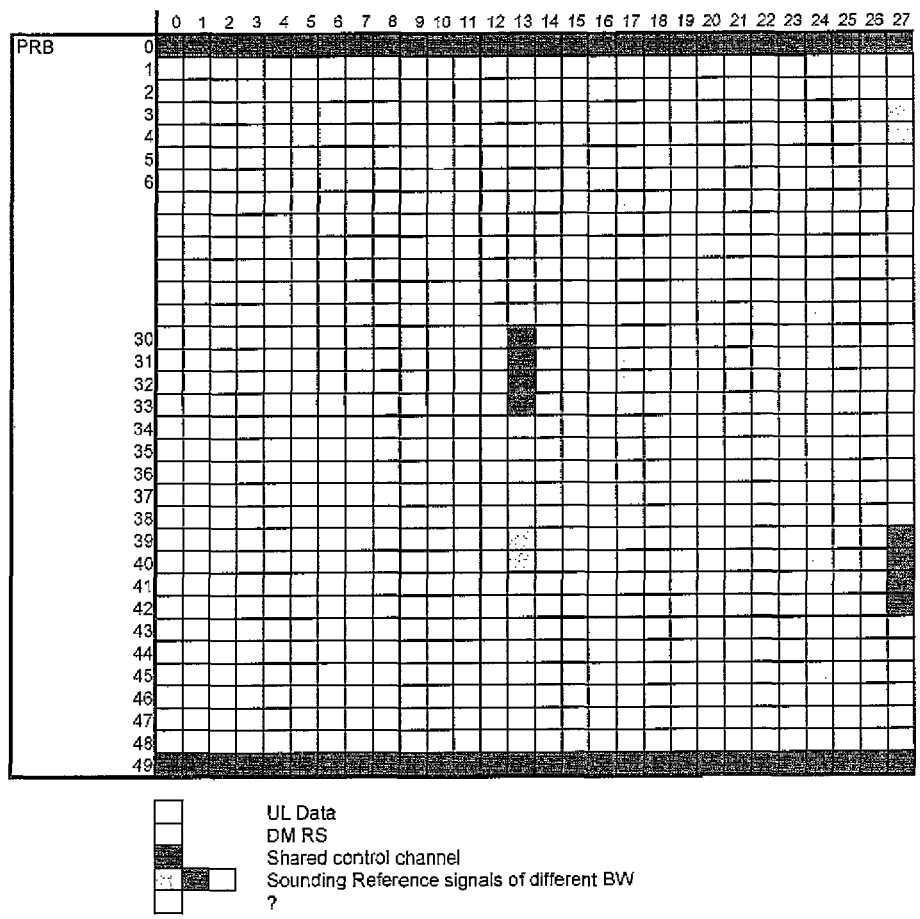
FIG. 3 illustrates allocation of symbols (for Code Division Multiplexing) and frequencies (for Frequency Division Multiplexing) for transmission of data and reference signals in an uplink signal.

FIG. 3 illustrates two transmission time intervals (each 14 symbols in LTE UL (Long Term Evolution UpLink), nominal CP (Cyclic Prefix) length) showing allocation of symbols along the upper axis and physical reference blocks down the side axis (having different frequencies for Frequency Division Multiplexing) for transmission of data and reference signals in an uplink signal.

As previously discussed, a problem to which certain embodiments of the present invention relate is system overhead caused by sounding reference signals. As previously stated, overhead caused by sounding reference signals will impact not only on the sounding user equipment but also on "non-sounding" user equipment being scheduled for the sounding bandwidth. This will be the case where all the scheduled user equipments lose the sounding symbol even though the sounding reference signal covers only part of the spectrum.

It has been agreed that sounding reference signals will be transmitted using one of the data blocks of the transmission time interval. The placement of the sounding reference signal has not been decided yet, but will be specified in any case. In the examples illustrated in FIGS. 4 and 5, the sounding reference signal has been placed on the last symbol of the transmission time interval although this is not essential.

According to one embodiment, a Node-B generates the "SRS presence bit" for each scheduling grant based on the presence, or absence, of sounding reference signals in the allocated frequency band. The two cases are illustrated in FIG. 4 ("SRS presence bit"=1) and FIG. 5 ("SRS presence bit"=0).

Figure 4:
FIG. 4 illustrates allocation of symbols and frequencies for transmission of data and reference signals in an uplink signal in the situation where uplink data and sounding reference signals have been allocated to an overlapping frequency band.

As can be seen in FIG. 4, uplink data and sounding reference signals have been allocated to an overlapping frequency band, "SRS presence bit=1". In this case the SRS symbol is not used for data transmission.

Figure 5:
FIG. 5 illustrates allocation of symbols and frequencies for transmission of data and reference signals in an uplink signal in the situation where uplink data and sounding reference signals have been allocated to non-overlapping frequency bands.

In contrast, as can been seen in FIG. 5, uplink data and sounding reference signals have been allocated to a non-overlapping frequency band, "SRS presence bit=0". In this case the SRS symbol is used for data transmission.

Furthermore, according to one embodiment, if the user equipment has been allocated for sounding reference signal transmission during a given transmission time interval, the "SRS presence bit" is always "1", i.e., the SRS symbol is not used for data transmission.

The user equipment decodes the uplink allocation grant and checks "the SRS presence bit". The user equipment will operate in the following way, depending on whether the SRS is present or not.

If the "SRS presence bit" equals to zero, then the user equipment will use all the data blocks for uplink data (and possible data-non-associated control signal) transmission.

If the "SRS presence bit" equals to one, then the user equipment will puncture the data/control signals away from the pre-defined data block. This data block corresponds to the pre-defined SRS block.

If the user equipment has sounding reference signals to be transmitted, it will transmit sounding reference signals on the pre-defined SRS resource (if it has been allocated for SRS transmission for the given TTI). If the user equipment does not have sounding reference signals to be transmitted, it will transmit nothing (discontinuous transmission—DTX) on the pre-defined SRS resource. The user equipment will not transmit on the pre-defined SRS resource if it has not been allocated for SRS transmission for the given TTI and some other user equipments are transmitting SRS using the given frequency and time resource.

Thus, according to embodiments of the present invention, presence of a sounding reference signal (SRS) in the reference block that a user equipment is using is indicated in the uplink scheduling grant by one additional bit.

In related art arrangements, controlling/reducing of SRS overhead is mainly considered to be done in the time domain (reducing the periodicity of sub-frames that include sounding reference signals). Using the proposed method, it is possible to use efficient sounding schemes with lower system overhead.

Embodiments of the present invention are especially useful if narrowband sounding reference signals are to be used.

Advantages of certain embodiments of the present invention include: simple implementation (no additional signaling format due to the SRS); no extra detection burden for the user equipment related to the detection of the SRS allocation from the common channels; no additional problems due to handover (common channel needs to be designed such that it is fast enough also in the case of handover); no additional error cases due to the possible failure of common channel signaling (uplink allocation grant contains all the rate matching parameters); and fast adjustment of overhead caused by SRS.

Using the proposed method, it is possible to use efficient sounding schemes with low overhead by signaling presence of sounding RS using allocation grant signaling, which is user equipment specific.

Although one additional bit for uplink allocation grant is needed this should not be an issue since the size of uplink allocation table is of the order of 30-40 bits.

It is noted that when using non-adaptive HARQ (Hybrid Automatic Repeat-reQuest) in uplink, the resource allocation for the re-transmissions can be based on a single bit only (i.e., "NACK"). Accordingly, in the case of non-adaptive HARQ, one needs to make the "SRS presence bit" decision at the Node B taking into account not only the actual TTI but also the forthcoming re-transmissions.

The required data processing functions may be provided by one or more data processors. Data processing may be provided in a central processing unit of an access system, or distributed across several data processing modules. For example, the access nodes may be adapted to perform the processing requirements on the network side. The data processing functions at the user equipment side may be provided by separate processors, see for example entities 3 and 9 of FIG. 2, or by an integrated processor. An appropriately adapted computer program code product or products may be used for implementing the embodiments, when loaded on an appropriate processor, for example in a processor of the mobile device and/or an access system controller. The program code product for providing the operation may be stored on and provided by a carrier medium such as a carrier disc, card or tape. A possibility is to download the program code product to a base station and/or mobile device via a data network.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004). It is noted that whilst embodiments have been described in relation to user equipment such as mobile terminals, embodiments of the present invention are applicable to any other type of apparatus suitable for communication via an access node. The wireless interfaces may even be based on different access technologies. A mobile device may be configured to enable use of different access technologies, for example, based on an appropriate multi-radio implementation.

It is also noted that although certain embodiments were described above by way of example with reference to the exemplifying architectures, embodiments may be applied to any other suitable forms of communication systems than those illustrated and described herein. It is also noted that the term access interface is understood to refer to any interface an apparatus configured for wireless communication may use for accessing applications.

The invention claimed is:

1. A method comprising:
incorporating sounding reference signal presence information into an uplink data resource assignment for a user equipment; and
sending the uplink data resource assignment including the sounding reference signal presence information to the user equipment,
wherein the sounding reference signal presence information consists of a single bit in the uplink data resource assignment,
wherein the uplink data resource assignment allocates frequency and time resources to the user equipment for use in uplink signalling,
wherein the sounding reference signal presence information indicates whether or not a sounding reference signal is present in the frequency and time resources allocated to the user equipment, and
wherein a frequency band allocated to the user equipment comprises a plurality of allocated data symbols and one of allocated data symbols is designated as a signal for sounding reference signalling.

2. The method according to claim 1, wherein the sounding reference signal presence information indicates whether or not a sounding reference signal is present in a resource allocated by the uplink data resource assignment to the user equipment for uplink data signalling.

3. The method according to claim 1, wherein the uplink data resource assignment allocates a frequency band for use by the user equipment in uplink signalling.

4. The method according to claim 3, wherein the sounding reference signal presence information indicates whether or not a sounding reference signal is present in the frequency band allocated to the user equipment.

5. The method according to claim 1, wherein the uplink data resource assignment allocates frequency and time resources to the user equipment for use in uplink signalling.

6. The method according to claim 5, wherein the sounding reference signal presence information indicates whether or not a sounding reference signal is present in the frequency and time resources allocated to the user equipment.

7. The method according to claim 3, wherein
the frequency band allocated to the user equipment comprises a plurality of allocated data symbols, and
one of allocated data symbols is designated as a signal for sounding reference signalling.

8. A method comprising:
receiving an uplink data resource assignment at a user equipment, the uplink data resource assignment comprising sounding reference signal presence information; and
sending uplink data from the user equipment based on the sounding reference signal presence information,
wherein the uplink data resource assignment allocates frequency and time resources to the user equipment for use in uplink signalling,
wherein the sounding reference signal presence information indicates whether or not a sounding reference signal is present in the frequency and time resources allocated to the user equipment, and
wherein a frequency band allocated to the user equipment comprises a plurality of allocated data symbols and one of allocated data symbols is designated as a signal for sounding reference signalling.

9. The method according to claim 8, further comprising:
controlling transmission of the uplink data from the user equipment based on whether or not the sounding reference signal is present.

10. The method according to claim 9, wherein the resource allocated to the user equipment comprises a plurality of data blocks.

11. The method according to claim 10, wherein, if it is determined that a sounding reference signal is present in a designated data block, uplink data is not transmitted on the designated data block.

12. The method according to claim 10, wherein, if it is determined that a sounding reference signal is present in a designated data block, and the user equipment is scheduled to transmit the sounding reference signal, then the user equipment transmits the sounding reference signal in the designated data block.

13. The method according to claim 10, wherein, if it is determined that a sounding reference signal is present in a designated data block, and the user equipment is not scheduled to transmit the sounding reference signal, then the user equipment transmits nothing in the designated data block.

14. The method according to claim 10, wherein, if it is determined that a sounding reference signal is not present in any of the data blocks, then the user equipment transmits uplink data over all said data blocks.

15. The method according to claim 10, wherein the uplink data comprises control signals and data signals.

16. An apparatus comprising:
a resource allocation unit to prepare an uplink data resource assignment for a user equipment and to incorporate sounding reference signal presence information into the uplink data resource assignment; and
a transmitter to send the uplink data resource assignment including the sounding reference signal presence information to the user equipment,
wherein the uplink data resource assignment allocates frequency and time resources to the user equipment for use in uplink signalling,
wherein the sounding reference signal presence information indicates whether or not a sounding reference signal is present in the frequency and time resources allocated to the user equipment, and
wherein a frequency band allocated to the user equipment comprises a plurality of allocated data symbols and one of allocated data symbols is designated as a signal for sounding reference signalling.

17. An apparatus according to claim 16, wherein the apparatus is a network entity.

18. An apparatus comprising:
a receiver to receive an uplink data resource assignment comprising sounding reference signal presence information; and a transmitter to send uplink data based on the sounding reference signal presence information, the uplink data being sent on a resource allocated by the uplink data resource assignment, wherein the uplink data resource assignment allocates frequency and time resources to the apparatus for use in uplink signalling, wherein the sounding reference signal presence information indicates whether or not a sounding reference signal is present in the frequency and time resources allocated to the apparatus, and wherein a frequency band allocated to the apparatus comprises a plurality of allocated data symbols and one of allocated data symbols is designated as a signal for sounding reference signalling.

19. An apparatus according to claim 18, where the apparatus is a user equipment.

20. A non-transitory computer readable storage medium storing a computer program to control a computer to perform a method comprising:

incorporating sounding reference signal presence information into an uplink data resource assignment for a user equipment; and sending the uplink data resource assignment including the sounding reference signal presence information to the user equipment, wherein the sounding reference signal presence information consists of a single bit in the uplink data resource assignment, wherein the uplink data resource assignment allocates frequency and time resources to the user equipment for use in uplink signalling, wherein the sounding reference signal presence information indicates whether or not a sounding reference signal is present in the frequency and time resources allocated to the user equipment, and wherein a frequency band allocated to the user equipment comprises a plurality of allocated data symbols and one of allocated data symbols is designated as a signal for sounding reference signalling.

* * * * *